Dec. 27, 1960     S. H. LIEBSON ET AL     2,966,589
COMPARISON SPINTHARISCOPE
Filed Sept. 28, 1956

INVENTORS
SIDNEY H. LIEBSON
WILLIAM A. LOEB
STEPHEN B. RANDOLPH
BY
ATTORNEYS

United States Patent Office 2,966,589
Patented Dec. 27, 1960

2,966,589
COMPARISON SPINTHARISCOPE

Sidney H. Liebson, White Plains, William A. Loeb, Chappaqua, and Stephen B. Randolph, New York, N.Y., assignors to Nuclear Development Corporation of America, White Plains, N.Y., a corporation of New York Filed Sept. 28, 1956, Ser. No. 612,830

9 Claims. (Cl. 250—78)

This invention relates to radiation detection devices and more particularly to a spinthariscope for the detection of gamma radiation.

An unfortunate concomitant of the beneficial applications of nuclear energy is the ever present hazard to human life of gamma radiation produced by sources of nuclear energy and nuclear reactions. At the center of this danger is the fact that nuclear radiation is not sensible; therefore, a person does not receive immediate warning of the presence of radiation so that he may protect himself from its effects as he can in the case of the more common dangers such as fire. Where the possible sources of radiation are localized, the perils are so serious as to require special precautions against subjecting persons to exposure to dangerous levels of radiation. Many types of complex and expensive instruments are utilized to detect the presence of radiation, and, where it is found, suitable safeguards are established to avoid the harmful consequences of exposure.

Should the use of nuclear weapons against masses of population come about, attended by widespread "fall out" of atmospheric contamination, the problem of aiding individuals in protecting themselves against exposure to harmful levels of radiation would require a practically impossible number and distribution of presently known radiation detection devices. It is, therefore, imperative that there be available for widespread distribution to individuals a simple and cheap instrument which can be used without special instruction so that each of them may determine on-the-spot whether there is present in his immediate vicinity a dangerously high level of harmful radiation. Specifically, such an instrument must be simply and ruggedly constructed and must have a reasonably long useful life, inasmuch as it will, of necessity, be distributed to the populace a potentially long time before its use becomes necessary. In the interim it must not deteriorate to such an extent that it becomes wholly unreliable for its intended purpose.

We have invented a new comparison-type spinthariscope for detecting the presence and intensity of gamma rays which, in its most elemental form, need have only one moving part. The construction of our new detection device is extremely simple and inexpensive and is particularly well adapted to production in great quantity for distribution among the public at large. No special instruction is required to make sufficiently accurate observation of ambient radiation so that a person may determine for himself whether a particular area is free from dangerous levels of radiation.

According to our invention we provide a particle-emitting, radioactive substance which emits particles such as α (alpha) particles or β (beta) particles at a predetermined rate over a relatively long period of time. We also provide a particular sensitive phosphor separate from the emitting substance which will radiate visible light of known brightness when it is bombarded by the particles of the kind and intenisty emitted by the radioactive substance. With this combination we include, adjacent the particle-sensitive phosphor, a gamma-sensitive phosphor which will emit visible light of a brightness substantially equal to the brightness of the particle-sensitive phosphor when the gamma-sensitive phosphor is exposed to gamma radiation equal to some minimum intensity such as the intensity which is dangerous to human beings. The phosphors and the standard particle-emitting substance are arranged within a housing so that the particle-sensitive phosphor may be removed from the influence of the particle-emitting substance except when it is desired to use the instrument to determine the intensity of radiation. This prevents the deterioration of the particle-sensitive phosphor when the instrument is not in use.

Our invention also contemplates a simple means of protecting the particle- and gamma-sensitive phosphors from the deleterious influences of light while the instrument is not in use.

These and other features of our invention are fully described in the following description of a particular embodiment. In the course of that description reference is made to the accompanying drawings in which.

Figure 1:
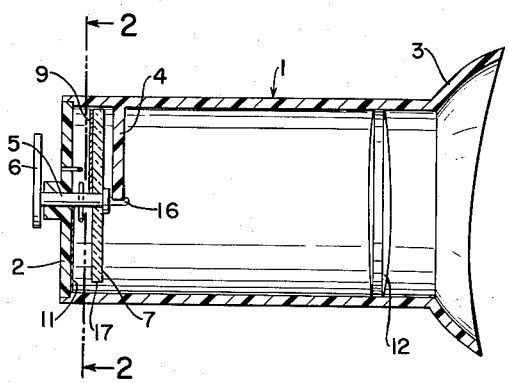
Fig. 1 is a side elevation in section of a spinthariscope.

In the drawing the reference numeral 1 generally indicates an opaque tubular body or housing of any suitably rigid material which may be inexpensive plastic or cradboard. One end of the housing is closed by an opaque end plate 2 of the same material. The other end of the body is provided with a suitably formed eyepiece 3 which serves to exclude light when the eyepiece is placed adjacent the user's eye. Although it is not necessary, we prefer that the inside surfaces of the housing be black and non-reflecting. Adjacent the end plate 2, but spaced therefrom, we provide an opaque, transverse shielding wall 4 extending substantially halfway across the interior of the body 1 to define a small space bounded by the end plate 2, the tubular body 1, and the wall 4. This space is substantially shielded from light entering from the open end of the tube.

A shaft 5 is rotatably journaled in the end plate 2 substantially coaxially of the tubular housing and is provided with an external indexing handle 6 so that the shaft may be rotated from outside the tube. A transparent disc 7 made of glass or a suitable plastic is fixed to the shaft 5 inside the tube and is located longitudinally of the housing so that a portion of the disc is positioned between the end plate 2 and the shielding wall 4. Rotation of the shaft 5 by means of the indexing handle 6 will rotate the disc 7.

The disc 7 carries radiation sensitive, phosphorescent material which is positioned on the surface of the disc in such a way that it may be rotated into view from the open end of the body 1 or rotated out of view and shielded from light behind the shielding wall 4.

Figure 4:
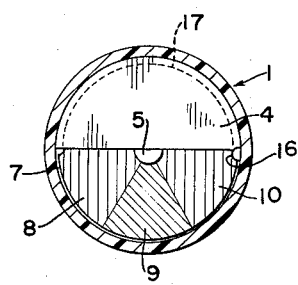
Fig. 4 is a section taken along the line 4—4 of Fig. 3.

In this embodiment a semi-circular area on the surface adjacent the plate 2 is divided into three areas 8, 9, and 10 as seen in Fig. 4. The central wedge-shaped area 9 is coated with a phosphor which is predominantly, if not wholly, sensitive to radiation particles; whereas, the wedge-shaped areas 8 and 10, to either side of the area 9, are coated with a phosphor which is predominantly, if not wholly, sensitive to gamma rays.

Any suitable phosphors may be used for these coatings. For example, the particle-sensitive coating on the central area 9 may be anthracene which is generally more sensitive to α (alpha) particles than to γ (gamma) rays. The phosphor coatings on the areas 8 and 10 may be any of the common phosphors such as calcium tungstate, cadmium tungstate, cadmium sulfide, or zinc oxide. A technique for adjusting the relative sensitivities of these materials to the different kinds of radiation, i.e., $\alpha$ and $\gamma$, is to use coatings of different thicknesses on the several areas. For example, the phosphor coatings on the areas 8 and 10 which are to be primarily $\gamma$ sensitive may be made relatively thicker than the coating on the area 9 which is to be primarily sensitive to $\alpha$ particles. By employing this technique it is even possible to use the same phosphor in different thicknesses for both the $\alpha$ and $\gamma$ sensitive coatings. In such case the $\alpha$ sensitive area 9 would be coated to a thickness of say 0.001 to 0.003 inch and the $\gamma$ sensitive areas 8 and 10 would be coated to a thickness of 0.005 inch or more.

It will be understood from the description this far that the coated semi-circular area of the disc 7 can be rotated by means of the indexing handle 6 so that the coated areas 8, 9, and 10 are visible from the open end of the tube 1, or they may be rotated so that they are substantially enclosed within the space between the end plate 2 and the semi-disc 4 where they are protected from light. This feature is particularly desirable because the phosphors named, as well as many others which may be used in accordance with our invention, are light sensitive. Obviously, if the phosphors were continuously exposed to light, their phosphorescent properties would soon degenerate to a degree which would render them useless.

Figure 3:
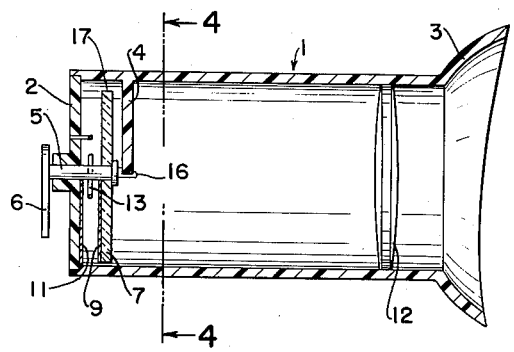
Fig. 3 is a side elevation in section of the spinthariscope of Fig. 1 showing the parts in different relative positions.
Figure 2:
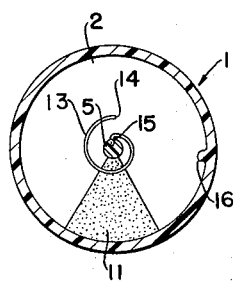
Fig. 2 is a section taken along the line 2—2 of Fig. 1.

A standard source of $\alpha$-particle radiation is provided by coating or otherwise applying a layer 11 of $\alpha$-particle emitting substance, e.g., radium sulphate, radium chloride, on the internal surface of the end plate 2. Specifically, the coating is applied over a wedge-shaped area of that half of the end plate visible from the open end of the tube. This is illustrated in Fig. 3. In this embodiment the area over which the particle-emitting substance is coated is centered on the vertical diameter of Fig. 2 and has approximately the same dimensions as the area 9 of the disc 7 on which the particle-sensitive phosphor is applied. Thus, when the disc 7 is rotated so that the coated area 9 is adjacent the coated portion of the end plate 2, the particles emitted by the radioactive substance 11 will cause the particle-sensitive phosphor to glow with an intensity determined by the characteristics of the phosphor and the level of the activity of the emitting substance.

Now, it will be understood that if $\gamma$ radiation from an external source is present the phosphors on the areas 8 and 10 of the disc 7 will also glow with an intensity determined primarily by the sensitivity of the phosphor itself and the intensity of ambient $\gamma$ radiation. The sensitivities of the phosphors and the activity of the emitting substance are selected so that the brightness of the glow from the particle sensitive phosphor is the same as the brightness of the $\gamma$ sensitive phosphor when they are excited by maximum safe levels of $\gamma$ radiation. Accordingly, this instrument serves, not only to detect the presence or absence of $\gamma$ radiation, but to indicate also whether the level of radiation is greater or less than the maximum safe level to which a human being may be exposed. The user of the instrument determines both of these factors merely by looking in the open end of the tube 1 and observing the relative brightnesses of the coated areas on the disc 7.

A basic instrument according to our invention has now been described. However, in the preferred embodiment illustrated in the drawing we fix near the open end of the tube a suitable viewing lens 12 which may be made very inexpensively from cast transparent plastic.

To insure that the disc 7 is not left in a position where the phosphors are exposed to light we also provide a small helical spring 13 fixed at one end 14 to the end plate 2 and at the other end 15 to the shaft 5. A disc stop 16 projects from the wall of the tube 1 adjacent the disc 7 and is arranged to engage the ends of a recess 17 which extends for slightly more than 180 degrees about the periphery of the disc. The location of this recess in the disc is such that when the spring 13 rotates the disc to a position where the phosphors on the areas 8, 9, and 10 are behind the wall 4 the disc stop 16 engages one end of the recess 17 and holds the disc in that position. Similarly, when the indexing handle is turned to bring the phosphors into viewing position the disc stop engages the other end of the recess to position accurately the coated area 9 over the particle-emitting coating on the end plate 2. It follows that whenever the disc is turned by means of the handle 6 to a position where the phosphors are exposed to light, and particularly when the particle-sensitive phosphor on the area 9 of the disc 7 is placed adjacent the particle-emitting substance 11 so that an observation may be made, the spring will always automatically rotate the disc to a position where the phosphors are protected when the indexing handle is released.

It is recognized that some phosphors which may be used in accordance with our invention are more sensitive to excitation by light than they are to excitation by $\alpha$ particles and $\gamma$ radiation. Where such phosphors are used, it is apparent that the housing, including the eyepiece on the open end thereof, must be designed so that visible light is substantially excluded from the interior of the housing while an observation is being made. If this is not done it is possible that a deceptive indication of radiation might be obtained due to excitation of the phosphors by light.

Those skilled in the art will immediately recognize that our invention may be embodied in many other forms besides that described above. For example, the phosphors may be placed on a sliding member rather than the rotatable disc 7. Moreover the geometry of the distribution of the phosphors is not limited to that described.

We claim:

1. A comparison spinthariscope for the detection and evaluation of the intensity of ambient gamma radiation which comprises a first member carrying a radioactive substance which emits at a predetermined intensity radiation particles selected from the group consisting of alpha and beta particles, a second member having on a portion of the area thereof more extensive than the area of the radioactive substance on said first member a phosphorescent coating sensitive to gamma radiation and to the particle radiation emitted by said radioactive substance, mounting means for said first and second members constructed and arranged to permit the substance carrying portion of said first member and the coating on said second member to be selectively moved into and out of juxtaposition.

2. A comparison spinthariscope according to claim 1 in which said phosphorescent coating on said second member comprises a phosphor sensitive to the particles emitted by the substance carried by said first member and which also comprises a phosphor sensitive to gamma radiation, said phosphors being on adjacent portions respectively of the surface of the second member.

3. A comparison spinthariscope for the detection and evaluation of the intensity of ambient gamma radiation, which spinthariscope comprises an opaque tubular body having an opaque end plate at one end of the body, said end plate carrying on less than all thereof a radioactive substance which emits particles selected from the group consisting of alpha particles and beta particles, an opaque light shield fixed in said body in spaced relation to said end plate and extending only partially across said body so as not to obscure from the opposite end of said body that portion of said end plate which carries said radioactive substance, a transparent plate movably mounted between the end plate and the light shield and having applied on juxtaposed areas thereof a phosphor sensitive to gamma radiation and a phosphor sensitive to particles emitted by said radioactive substance, and means for selectively positioning the phosphor bearing areas of said transparent plate between the end plate and the light shield or between the open end of the tubular body and particle emitting substance bearing area of the end plate.

4. A comparison spinthariscope for the detection and evaluation of the intensity of ambient gamma radiation, which spinthariscope comprises an opaque tubular housing having an opaque light shielding end plate at one end and having a viewing lens and light shielding eye piece at the other end, said end plate carrying a radioactive substance which emits particles selected from the group consisting of alpha particles and beta particles, an opaque shielding wall fixed in said housing normal to the axis thereof and between the end plate and the eye piece, a transparent disc mounted in said housing for rotation coaxially thereof and positioned longitudinally of the body between the end plate and the shielding wall, one area of a semi-circular portion of said disc having applied thereto a gamma ray sensitive phosphor, another area of the same semi-circular portion of the disc having applied thereto a phosphor sensitive to the particles emitted by said radioactive substance, said radioactive substance being applied to a portion of the end wall not obscured from the viewing lens by said wall, and means external to said housing for rotating said disc.

5. A comparison spinthariscope according to claim 1 and which further comprises a housing of a material which is opaque to light and in which said first and second members are contained, said housing having an aperture therein which is located so that the phosphorescent substance on said second member may be viewed from outside the housing only when the substance bearing portions of the members are in juxtaposition.

6. A comparison spinthariscope according to claim 5 in which the housing comprises members defining an internal compartment adapted to receive the second member and shield the phosphorescent material thereon from incident light when the substance-bearing portions are out of juxtaposition.

7. A comparison spinthariscope for the detection of and evaluation of the intensity of ambient gamma radiation, which spinthariscope comprises a first member carrying an alpha particle emitting substance, a second member bearing on a first portion thereof a phosphorescent substance predominantly sensitive to alpha particle radiation and bearing on a second portion thereof a phosphorescent substance predominantly sensitive to gamma radiation, and means for selectively placing the alpha sensitive substance on said second member into or out of juxtaposition to the particle emitting substance on said first member.

8. A comparison spinthariscope according to claim 4 in which the means for rotating said disc comprises a shaft journaled in the end plate, said disc being fixed to a portion of said shaft extending into the housing, and an indexing handle fixed to a portion of the shaft extending out of the housing.

9. A comparison spinthariscope according to claim 4 which comprises a spring return means for automatically positioning the semi-circular portion of the disc between the shield and the end plate.

References Cited in the file of this patent
UNITED STATES PATENTS

| | | |
|---|---|---|
| 2,578,703 | Hopkins et al. | Dec. 18, 1951 |
| 2,715,684 | Schwarz | Aug. 16, 1955 |
| 2,721,274 | Garbellano et al. | Oct. 18, 1955 |

UNITED STATES PATENT OFFICE
CERTIFICATION OF CORRECTION

Patent No. 2,966,589                              December 27, 1960

Sidney H. Liebson et al.

It is hereby certified that error appears in the above numbered patent requiring correction and that the said Letters Patent should read as corrected below.

Column 1, line 68, for "particular" read -- particle --; column 2, line 1, for "gamma-senistive" read -- gamma-sensitive --; line 31, for "cradboard" read -- cardboard --.

Signed and sealed this 23rd day of May 1961.

(SEAL)
Attest:

ERNEST W. SWIDER                                            DAVID L. LADD
Attesting Officer                                                   Commissioner of Patents